UNITED STATES PATENT OFFICE.

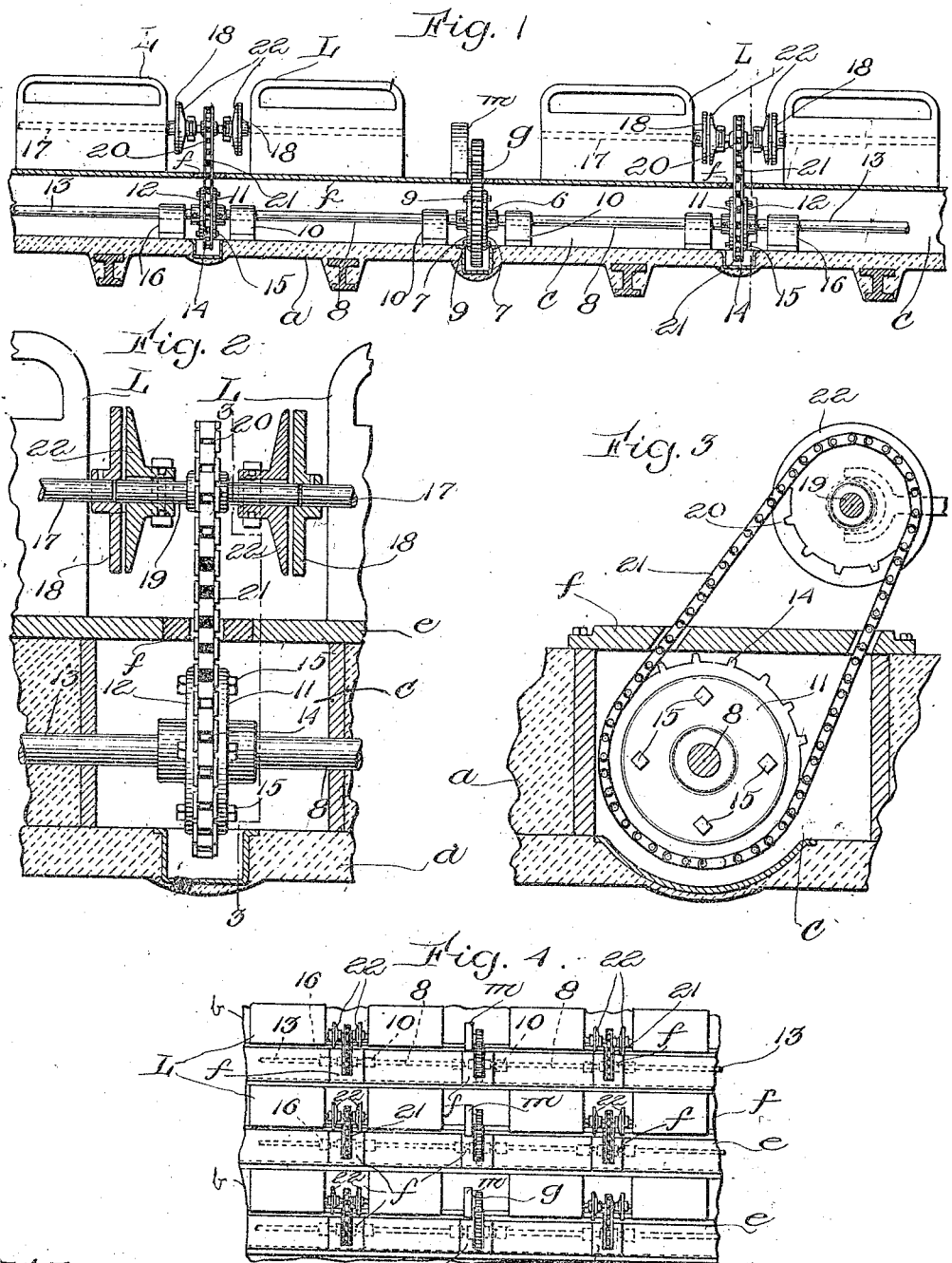

WILLIAM H. HARRISS, OF PAWTUCKET, RHODE ISLAND.

DRIVING MECHANISM.

1,006,938.   Specification of Letters Patent.   Patented Oct. 24, 1911.

Application filed May 8, 1911.   Serial No. 625,862.

*To all whom it may concern:*

Be it known that I, WILLIAM H. HARRISS, of Pawtucket, in the county of Providence and State of Rhode Island, have invented certain new and useful Improvements in Driving Mechanism, of which the following is a full, clear, and exact explanation, reference being had to the accompanying drawings, forming part thereof.

This invention has reference to improvements in driving mechanism for machines adapted to be arranged in line, and relates particularly to loom driving mechanisms.

One object of the invention is to secure the advantages of direct driving by motors, appertaining to the several machines with the advantage of securing increased power, when starting any of the machines.

Another object of the invention is to so construct and mount driving mechanism, that overhead shafts and such belt holes through the flooring as will admit drafts of air can be avoided.

Other objects of the invention will appear from the following description.

The invention consists in the combination with a main line drive shaft rotatably mounted below the base level of the machine to be driven, said shaft being formed of a series of sections having drive members secured therebetween, and said shaft having a drive gear located at a point intermediate its length and adapted to be driven by a prime motor.

The invention also consists in the means for transmitting motion from said main drive shaft to either or both of a pair of machine shafts by means of a drive gear in constant driving connection with said main drive shaft.

The invention also consists in such other novel features of construction and combination of parts as shall hereinafter be more fully described and pointed out in the claims.

Figure 1. represents a front elevation of a series of looms as driven by the improved driving mechanism. Fig. 2. represents an enlarged detail view of portions of Fig. 1. Fig. 3. represents a sectional view taken on line 3—3 Fig. 2. Fig. 4. represents a plan view, showing looms or other machines arranged in line with the prime motors by which said machines are driven as in Fig. 1.

Similar characters of reference designate corresponding parts throughout.

It has occurred to me that, having a reinforced concrete floor *a*, without belt openings and with the desire, as one of my objects, to avoid the use of overhead shafts and pulleys in the room above said floor *a*, the looms or other machines could be arranged in line with a single prime motor, preferably an electric motor, and driven from a main line shaft located below the base level of said machines and having a gear, driven by said motor, and a series of sprockets, from each of which, preferably, two of said machines could be driven through the medium of a sprocket on an intermediate shaft having two complemental clutch members, each of which members coöperates with a complemental clutch member fixed on the drive shaft of one of the machines to be driven.

In carrying the invention into practice, I construct the supplemental floor *b*, raised from the floor *a*, and having a series of parallel channels or shaft tunnels *c*, *c* spaced apart sufficiently to permit of the location between each pair of such tunnels of a line of the machines to be driven which, in the present instance, are the looms L, L. The tunnels *c*, *c* are closed by the removable floor boards *e*, *e*, which are flush with the floor *b*, and by the bridge pieces *f*, *f*, having openings through which sprocket chains may extend.

Each row of machines is driven by a prime motor *m*, located at points intermediate the two series of machines forming said row. The gear *g* of said motor, is in engagement with the large gear 6, which is removably secured between the enlargements 7, 7 of the shafts 8, 8 by the bolts 9, 9. These shafts 8, 8 are journaled in bearings 10, 10, located in the tunnels *c*, *c*, and have enlargements or flanges 11, 11 between which, and the similar flanges 12, 12 of the shafts 13, 13, are removably secured the sprockets 14, 14 by means of the bolts 15, 15. These shafts 13, 13 and any similar shafts arranged in line therewith are journaled in bearings 16, 16 located in the tunnels *c*, *c*.

Each of the looms or other machines L, L has the drive shaft 17 furnished with the friction clutch member 18, fixed to said shaft, and rotatably mounted between the shafts 17, 17 of each pair of looms is the auxiliary shaft 19, having the sprocket 20, driven by means of the chain 21 from its related sprocket 14 of the main line drive shaft 13, 13, which, said shaft 19, is also furnished with the slidable clutch members 22, 22 by means of which the shaft 17 may be connected, through the clutch members 18, 18, with either of the looms L, L of each pair. By this construction the main line drive shaft, comprising the shaft sections 8, 8 and 13, 13 and their connections, is supported on a substantial base and is always in alinement while said shaft and its bearings are readily accessible.

Each of the motors m, m is of sufficient power to drive the entire row of looms or other machines connected with its main line drive shaft, and as it is not customary to start all the looms at one time, there is generally reserve power of the motor to effect the starting of any one machine, which is not the case where a motor of a comparatively small power is connected with each machine. It is found, as a fact, that the placing of the motor midway of the row of machines to be driven through this main line shaft, is extremely economical, both as to the size of motor and the consumption of energy in a given size of motor.

Having thus described my invention, I claim as new and desire to secure by Letters Patent.

1. Driving mechanism of the nature described, comprising a pair of driven shafts, clutch members thereon, an auxiliary shaft rotatably mounted between said driven shafts, a sprocket on said auxiliary shaft, a pair of clutch members mounted on said auxiliary shaft and adapted to be operated to effect driving connection with said clutch members of the driven shafts, and means for driving said sprocket of the auxiliary shaft, substantially as described.

2. Driving mechanism of the nature described, comprising a row of driven shafts arranged in pairs, a main line drive shaft journaled in bearings below said driven shafts, sprockets on said main shaft positioned in registry with the spaces between the driven shafts of each pair, chains on said sprockets, auxiliary shafts journaled in bearings, sprockets on said auxiliary shafts, driven by said chains, coöperating devices for transmitting motion from said auxiliary shafts to said driven shafts, and a prime motor in connection with said main line drive shaft, substantially as described.

3. Driving mechanism of the nature described, comprising a substantial imperforate base or floor, a main line drive shaft journaled in bearings mounted on said base, sprockets carried by said shaft, a prime motor located at a point intermediate the ends of said shaft and in driving connection therewith, driven shafts located in line with said motor and arranged in pairs, said driven shafts being approximately in alinement, driving means for said driven shafts located between the shafts of each pair thereof, and chains in engagement with members of said driving means and with said sprockets of the main shaft substantially as described.

4. Driving mechanism of the nature described, comprising a row of driven shafts arranged in pairs, auxiliary shafts located between each pair of said driven shafts, sprockets on said auxiliary shafts, means for transmitting motion from said auxiliary shafts to said driven shafts, a prime motor, a main line drive shaft journaled in bearings below the base line of said motor and said driven shafts, means for transmitting motion from said motor to said main line shaft, sprockets carried by said main line shaft and in registry with the sprockets of said auxiliary shafts, and chains in engagement with the sprockets of said main line shaft and with the sprockets of the respective auxiliary shafts, substantially as described.

WILLIAM H. HARRISS.

Witnesses:
J. F. BROWNING,
HORACE GREEN.